May 13, 1958 — J. W. DEER — 2,834,214

GRAVITY RESPONSIVE CONTROL SYSTEM

Filed Oct. 21, 1957

INVENTOR
James W. Deer

BY
Mark Richardson
AGENT

United States Patent Office 2,834,214
Patented May 13, 1958

2,834,214

GRAVITY RESPONSIVE CONTROL SYSTEM

James W. Deer, Portland, Oreg., assignor to Iron Fireman Manufacturing Company, a corporation of Oregon Application October 21, 1957, Serial No. 691,370

6 Claims. (Cl. 74—5.6)

This invention relates generally to control systems responsive to divergence of a system from a preset condition to return the system to the preset condition.

More particularly this invention relates to a means for sensing the divergence of a universally mounted device from a gravity vertical reference and to a means for driving the divergent device in any required direction towards its position of reference.

For clarity of exposition of one form in which the invention may be practiced there is here disclosed a system including a gravity vertical gyroscope whose means for sensing its divergence from a gravity vertical reference is the new and useful four way gravity sensing captive bubble type of potentiometer of this invention. The system includes a pair of permanently split phase single phase motors respectively adapted to torque the outer and inner gimbal rings of the gyroscope in the direction required to precess the gyroscope towards its vertical reference position. The system also includes a new and useful electric circuit means controlled by the potentiometer selectively to energize either or both of the motors to torque the gimbal rings selectively as required.

It is well known to workers in the art of precise control of an airplane and its electronic instruments in flight that where a gyroscope is used to determine the angular drift of the gyro spin axis from its gravity vertical reference, it is a critical problem to provide a vertical sensing device which is accurate, sensitive vibration resistant, and has a low mass shift during acceleration of the airplane. It is a principal object of this invention to provide such a device. The less successful devices of the past have included pendulum switches of the mechanical or the rolling mercury types and electrical resistance devices including the type with an electrolyte with a free bubble. All of these previous devices have had their characteristic difficulties.

The electrolyte and free bubble devices of the prior art have the disadvantage that under vibration conditions the bubble tends to break up. Also such a device has a specific lag error due to surface tension and capillarity of the electrolyte at the bubble boundary. Again, in the previous bubble type devices both change of temperature and pressure cause consequent changes in bubble size with consequent errors of operation. It is a second object to provide an electrolytic gravity sensitive device having a captive bubble of substantially constant dimensions and submerged at all times in the electrolyte to eliminate the above enumerated difficulties of the prior device.

It is a third object to provide a four way gravity sensing device of the resistance electrolytic type having only four electrodes or terminals and these four terminals spaced in quadrature about the vertical axis of the device.

It is a fourth object to provide an electric circuit with means controlled by the last mentioned gravity sensing device to energize selectively a pair of two way motors to torque gyroscope parts about perpendicular axes to cause the gyroscope to precess towards its vertical reference position.

How these and other objects are attained is explained in the following description referring to the attached drawing in which Fig. 1 is a conventionalized view in perspective of a gyro vertical shown as a part of a system in which this invention may be practiced.

Like reference numerals refer to like parts in the several figures of the drawing.

Figure 1:
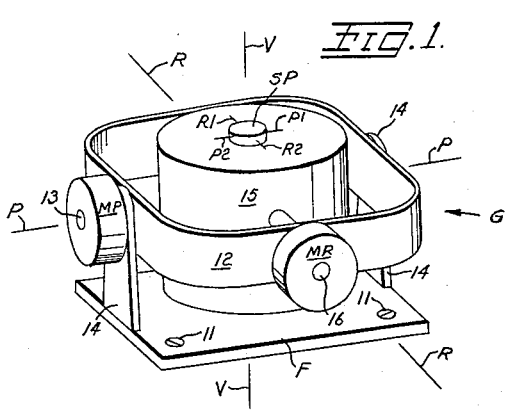

Referring now to Fig. 1 of the drawing a gyroscope G having a gravity vertical reference axis V is seen to have a frame F secured by screws 11 to an airframe or other platform, not shown, whose vertical angular position in every direction with respect to the platform is desired to be known at all times.

Secured to outer gimbal ring 12 in alinement with axis P are a pair of journals 13, one shown, rotatably carried in bearings, not shown, fixed to bearing supports 14 respectively of frame F.

Secured to inner gimbal ring or case 15 in alinement with axis R are a pair of journals 16, one shown, rotatably carried in bearings, not shown, fixed to outer gimbal ring 12.

Rotatably carried on a stationary shaft 17 in alinement with axis V and within case 15 is a gyroscope wheel, not shown, and spin motor, not shown, for keeping the wheel in constant rotation while the gyroscope is in use for its purpose.

Having its stator fixed to one of the supports 14 of frame F and its rotor fixed to one of the pair of journals 13 of outer gimbal ring 12 is a P axis torque motor MP axially alined with the P axis.

Having its stator fixed to outer gimbal ring 12 and its rotor fixed to one of the pair of journals 16 of inner gimbal ring or case 15 is an R axis torque motor MR axially alined with the R axis.

Figure 3:
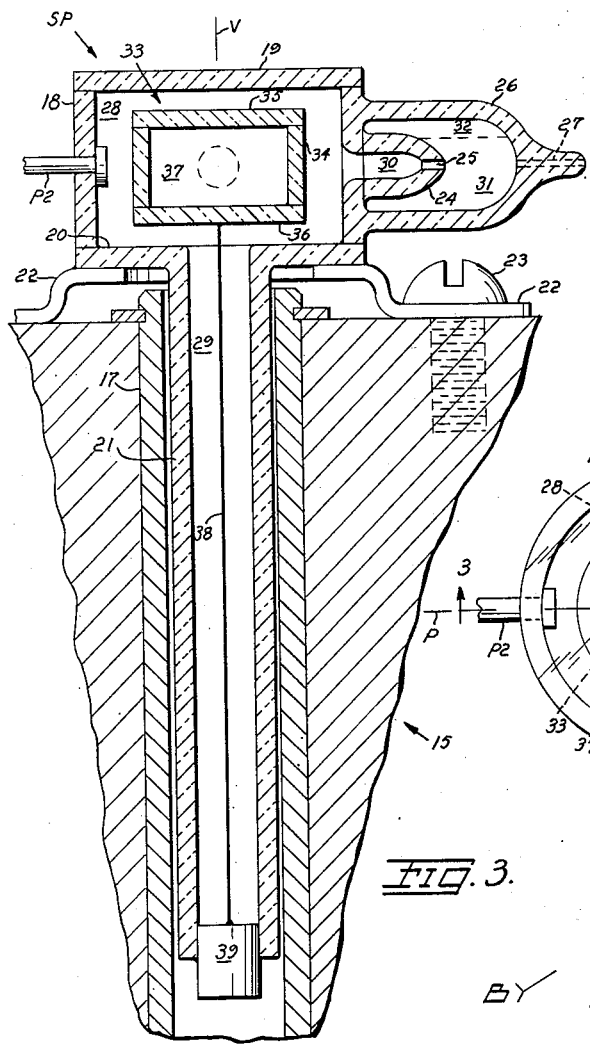
Fig. 3 is a fragmental elevation view in partial section as seen from the line 3—3 of Fig. 2.
Figure 2:
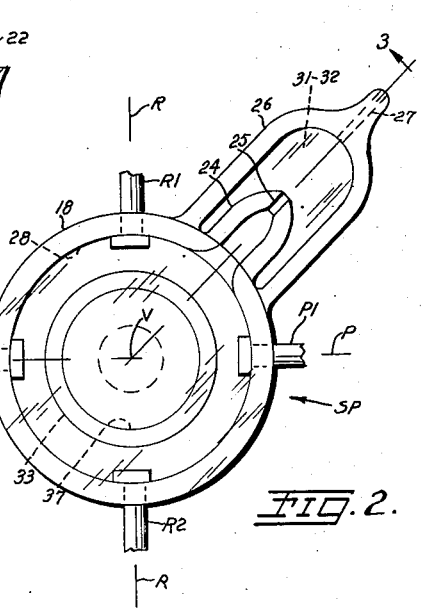
Fig. 2 is an enlarged fragmentary plan view of the top of the form of the gravity sensing potentiometer of this invention shown in Fig. 1.

The captive bubble gravity vertical sensing potentiometer SP of this invention as shown in Figures 1 to 3 is seen to include a section of a Pyrex glass cylinder 18 closed at its top by a Pyrex disk 19 fused thereto. Secured by fusing to the bottom of cylinder 18 is the upper end flange 20 of hollow Pyrex tube 21. In Fig. 3 it is shown that the under surface of Pyrex flange 20 is secured by a compatible adhesive to hollow cupped washer 22 secured to case 15 by screws 23, one shown. Fused to the side of cylinder 18 is short hollow stem 24 formed with a capillary hole 25 through the end thereof opening into the interior of a second hollow stem 26 also fused to the side of cylinder 18. Stem 26 when made has a filling hole 27 formed through a wall thereof. Hole 27 is sealed off as shown during the final assembly of the device SP when the interior spaces 28, 29 and 30 are filled with an electrolyte and space 31 is partially filled. The purpose of stems 24 and 26 is to provide a space 31 in which after filling the device with electrolyte a small air bubble may be isolated as at 32 to allow for the expansion or contraction of the electrolyte.

Within space 28 is a bubble 33 having a Pyrex glass shell made of a cylinder 34 and top and bottom disks 35 and 36. The interior space 37 of bubble 33 is air filled and the ratio of the weight of air to the weight of glass within the outer surface of bubble 33 is such as to make bubble 33 weigh approximately ninety-five percent of the weight of the electrolyte it displaces. To keep the positioning of bubble 33 from being affected by vibration of frame F or by the capillary adhesion of contact with the walls of space 28, bubble 33 is buoyantly supported in the electrolyte filling space 28 and is held submerged in the electrolyte at a substantially constant depth by glass fiber 38. Fiber 38 is fused at its upper end to bottom disk 36 of bubble 33 and at its bottom end to Pyrex plug 39 which in turn is hermetically sealed by fusing into tube 21.

It is seen that in effect the device 33 is the equivalent of a bubble of constant size and shape, slightly buoyant in a somewhat viscose liquid to avoid vibration effects and held captive by fiber 38 to be approximately equally spaced vertically between disks 19 and 20. In the arrangement shown device 33 is called a captive bubble and the device SP may be called a captive bubble, gravity vertical sensing, electrolytic, four way, potentiometer, with terminals R1, R2, positioned diametrically in the walls of cylinder 18 in a plane including the V and R axes and with terminals P1, P2, positioned diametrically in the walls of cylinder 18 in a plane including the V and P axes. Terminals R1, R2, P1 and P2 may be of platinum fusedly sealed through the wall of glass cylinder 18 and with heads extending inwardly as shown from the inner surface of cylinder 18.

To show the approximate size of one form of the SP device, the interior dimensions of the cylinder 18 are about 385 mils diameter and about 240 mils high. The outside dimensions of the captive bubble 33 are about 273 mils diameter and 180 mils high. Pyrex fiber 38 is about 2 mils diameter and about one inch (1000 mils) long. The center of the inner surface of the head of any of the electrodes R1, R2, P1, P2, is normally radially spaced about 37 mils from the cylindrical outer surface of bubble 33. The inside diameter of tube 21 is about 100 mils. Even though the spin axis V of the gyroscope is tipped away from its gravity vertical reference sufficiently for bubble 33 to contact one or two of the electrode heads the fiber 38 will not contact the wall surface of tube 21.

Figure 4:
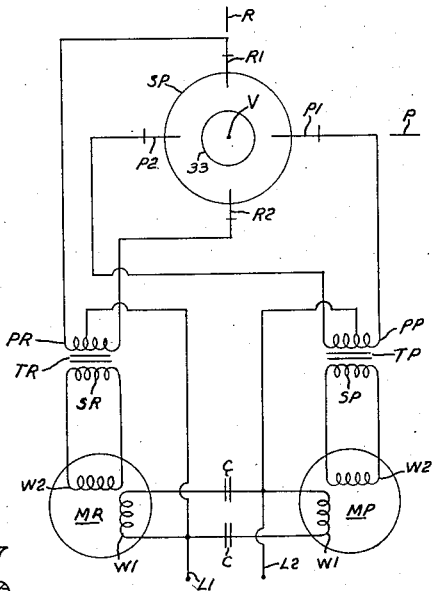
Fig. 4 is a schematic electric circuit diagram of the disclosed form in which my invention is shown to be practiced.

The novel and useful electric circuit of the present system is shown in Fig. 4, wherein it is clear that each of gimbal ring erecting motors MR and MP have one phase winding W1 continuously energized from a single phase power source L1, L2, through respective phase splitting condensers C. Each of the quadriphase windings W2 of the respective motors MR and MP are variably energized through the respective secondary windings SR and SP of their respective transformers TR and TP the primary windings PR and PP of which have centertaps L1 and L2 respectively connected to power source lines L1 and L2. Electrodes R1, R2 of potentiometer SP are connected respectively to the ends of transformer primary winding PR while electrodes P1 and P2 of potentiometer SP are connected respectively to the ends of transformer primary winding PP.

The operation of the form of the invention here shown is as follows. With the above novel and useful circuit arrangement and parts, the resistance through the electrolyte filled space 28 between electrodes R1 and R2 will be substantially constant regardless of the position in the electrolyte of insulating captive bubble 33. Also the resistance through the space 28 between electrodes P1 and P2 will be substantially constant regardless of the position in the electrolyte of bubble 33. Current at a constant rate therefore traverses the circuit from L1, through primary winding PR, electrodes R1, R2, the electrolyte in space 28, electrodes P1, P2, primary winding PP and back to L2 at all times. But should potentiometer SP be tilted towards P1 along the P axis to displace bubble 33 towards electrode P2 along the P axis the flow of current through the electrolyte from R1 and R2 to P1 will increase and the flow of current through the electrolyte from R1 and R2 to P2 will decrease. And of course the current flow through the half of transformer primary winding PP between electrode P1 and line L2 will dominate the magnetic circuit of transformer TP and motor MP will be energized in the direction required to put torque on axle 13 about the P axis to cause case 15 to precess about the R axis to restore bubble 33 towards its position of equal distance between electrodes P1 and P2. Similarly further consideration of the circuit and of the included devices will show that no matter the direction of tilt of case 15 and the resultant movement of bubble 33, the movement of bubble 33 in any direction will immediately alter the currents circulating in the system to start either or both of the motors MR and MP to rotating in their respectively required directions to restore bubble 33 to its desired position of equidistance from each of the electrodes R1, R2, P1 and P2.

It should be noted particularly that with a length of fiber 38 from the attachment to plug 39 to the center of bubble 33 of about 1090 mils and the normal distance of the end surface of one of the electrodes R1, R2, P1, and P2 to the outer surface of bubble 33 being about 37 mils the miximum erecting force of either or both of the motors MR and MP will come into play at an angular tilt of the potentiometer SP of less than 2 degrees and that the motor erecting force or speed of erection will increase with the displacement as the displacement or tilt varies from nothing to about 2 degrees.

Again it should be noted that the present system consistently and with greater precision than previously known systems continuously operates to erect the vertical axis of the gyroscope towards its gravity vertical reference and that usually the gyroscope thus precisely positioned is used as a vertical reference for telling the position with respect thereto of the platform on which the gyroscope is mounted. Such uses of the continuously erected gyroscope are old in the art and therefore are not here described.

Having thus recited some of the objects of my invention, illustrated and described one form in which my invention may be practiced and explained its operation, I claim:

1. A gravity responsive control system for a gyroscope having a first axis required to be continuously erected towards a gravity vertical reference position, said gyroscope being gimbal supported for free movement about second and third mutually perpendicular axes to allow said first axis to be erected towards said reference position, said system including a pair of two directional electric motors each adapted when selectively energized to apply a torque to said gyroscope in a selected direction about one of said second or third axes to precess said gyroscope about the other of said second or third axes toward its said reference position, said system including a gravity vertical sensing four terminal potentiometer, and said system including additional circuit means responsive to said sensing means for selectively varying the energization of said motors continuously to torque said gyroscope about selected axes to erect said gyroscope toward its said reference position, said potentiometer including an insulating container filled with a liquid electrolyte having a selected specific electric resistance, an insulating body buoyantly supported in said electrolyte for free lateral motion therein, laterally flexible vertical tension filar means attached at one end interiorly to said container below said body and at the other end to said body on the vertical centerline thereof to tether said body submerged in said liquid, four electrodes extending through the wall of said container, the inner ends of said electrodes being spaced in quadrature about said centerline and radially equidistant from said body when said first axis of said gyroscope is in its vertical reference position.

2. The system of claim 1 in which said additional circuit means includes a pair of electric conductors leading from a single phase source of power, said motors being single phase split phase capacitor run type, one winding of each of said motors being connecting through a respective capacitor to said pair of conductors, a separate transformer for each of said motors, the other winding of each of said motors being operatively connected to the secondary winding of its respective transformer, the primary windings of each of said transformers being connected across a respective diametrically positioned pair of said electrodes of said four electrode potentiometer, the primary windings of each of said transformers being center tapped and the center taps of said primary windings being connected respectively with said pair of conductors.

3. A potentiometer having an axis with a gravity vertical neutral position and means for dividing an electric current of approximately constant total value between two branches of an electric circuit in response to the divergence of said axis from said neutral position, said potentiometer including an insulating container filled with a liquid electrolyte and four electrodes supported on the inner surface of said container in quadrature about said axis and radially equidistant from said axis when said axis is in said neutral position, one diametrically opposite pair of said electrodes being operatively connected to one terminal of a power source, the other diametrically opposite pair of said electrodes being operatively connected to the other terminal of said power source, and said means for dividing an electric current of approximately constant total value between two branches of an electric circuit in response to the divergence of said axis from said neutral position includes an insulating body supported in said electrolyte for free lateral motion therein in response to the divergence of said axis from said neutral position, said body being equally radially spaced from said electrodes when said axis is in said neutral position, whereby said two branches of an electric circuit will be the circuits respectively of the diametrically opposite electrodes when said body moves parallel to the axis of said opposite electrodes.

4. A potentiometer including an insulating container having an axis, said container being filled with a liquid electrolyte having a selected specific electric resistance, an insulating body buoyantly supported in said electrolyte for free lateral motion therein about said axis when said axis is vertical, a laterally flexible vertically tensioned filar means attached at one end to said container below said body on said axis, the other end of said filar means being secured to said body on said axis to tether said body submerged in said liquid, four electrodes on the interior wall surface of said container, the inner ends of said electrodes being spaced in quadrature about said axis and radially equidistant from said body when said axis is vertical.

5. The potentiometer of claim 4 including an air chamber and passageway means in said air chamber for barometrically connecting said air chamber with the interior of said container together with means in said air chamber for preventing air from said air chamber from passing said passageway into said container.

6. The potentiometer of claim 4 including a two terminal power source and four circuits of equal impedance connecting said electrodes with said terminals, two of said circuits connecting one electrode respectively of one pair of diametric electrodes to one of said terminals, the other two of said circuits connecting one electrode respectively of the other pair of diametric electrodes to the other of said terminals whereby the total instantaneous current flowing between one of said terminals and its two diametric electrodes will remain constant and the proportion of said total current flowing between said one of said terminals and one of its said two diametric electrodes will be a function of the position of said body along the axis of said two diametric electrodes.

References Cited in the file of this patent
UNITED STATES PATENTS

| | | |
|---|---|---|
| 2,387,313 | Wilson | Oct. 23, 1945 |
| 2,713,726 | Dixson | July 26, 1955 |
| 2,713,727 | Balsam | July 26, 1955 |